No. 621,566. Patented Mar. 21, 1899.
J. H. HENDY.
ANTIFRICTIONAL ATTACHMENT FOR WATER OR OTHER GATES.
(Application filed May 2, 1898.)
(No Model.)
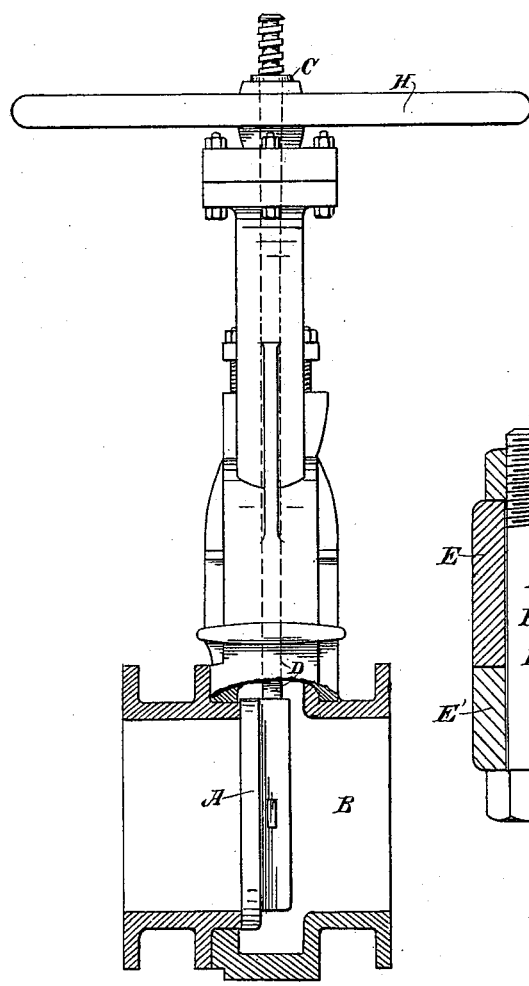
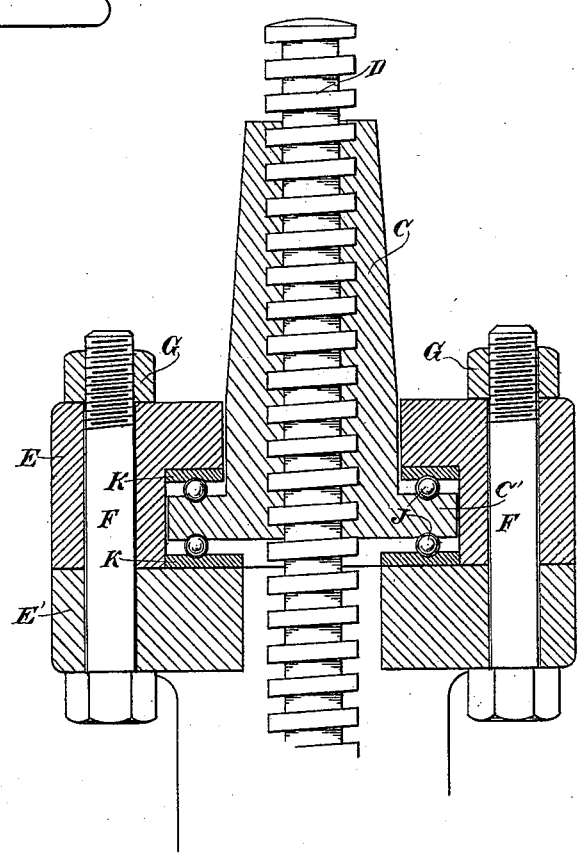
Witnesses,
Inventor,
John H. Hendy
By Dewey Strong & Co.
Attys

UNITED STATES PATENT OFFICE.

JOHN HARRIS HENDY, OF SAN FRANCISCO, CALIFORNIA.

ANTIFRICTIONAL ATTACHMENT FOR WATER OR OTHER GATES.

SPECIFICATION forming part of Letters Patent No. 621,566, dated March 21, 1899.

Application filed May 2, 1898. Serial No. 679,514. (No model.)

*To all whom it may concern:*

Be it known that I, JOHN HARRIS HENDY, a citizen of the United States, residing in the city and county of San Francisco, State of California, have invented an Improvement in Antifrictional Attachments for Water or other Gates; and I hereby declare the following to be a full, clear, and exact description of the same.

My invention relates to an attachment for water and other gates which is especially designed to relieve the friction of the flange of the turnable nut by which the gate-actuating screw is reciprocated in one direction or the other in order to open or close the gate transversely of the passage which it controls.

The invention comprises details of construction which will be more fully explained by reference to the accompanying drawings, in which—

Figure 1 is a general view of the device. Fig. 2 is an enlarged vertical section of the upper portion of the same.

This device is especially designed for application to single transversely-moving gates A, which open or close the passage in the pipe B and in which the gate is operated by a stem D, the upper end of which is screw-threaded and fits the correspondingly-screw-threaded interior of an elongated nut C. In my invention this nut has a horizontal projecting annular flange C' at the lower end, and this flange is inclosed in the chamber formed in the cap E, through which the elongated portion or shank of the nut C passes upwardly. The cap E is secured to the head E' by bolts F and nuts G.

The upper end of the elongated nut C is made polygonal or of any suitable or desired shape to receive the hand-wheel H, by which it may be turned, and when so turned the flange C' is pressed against either the top or bottom of the chamber formed within the cap E, and this acts as a fulcrum to advance the screw D, and thus move the valve A in the direction in which the screw advances. The diameter of the flange C' is considerable, and its distance from the center makes the friction in turning it very great. My invention is designed to relieve this friction, and for this purpose I make annular grooves or channels in both the top and bottom of the flange C'. Corresponding grooves or channels may be made in the inner coincident faces of the head E' and the cap E, and in these grooves or channels are placed balls J, which serve as bearings, upon which the flange C' travels easily, and the friction at this point is reduced to a minimum. Instead of making the grooves or channels in the cap and head I prefer to employ the annular steel flanges K, which fit into the chamber formed in the cap E, one of said flanges resting upon the head E' and the other fitting into the upper part of the chamber in the cap E. These annular disks are grooved or channeled to coincide with the grooves or channels in the flange C', and the balls thus travel between these parts. The disks K may thus be removed and renewed at any time when it is found necessary, and any adjustment to regulate the bearings may be made by means of the nuts G screwing upon the bolts F. By this construction I am enabled to greatly reduce the frictional resistance upon the flange C', and as the rollers or balls are arranged both above and below the flange the pressure in either direction to open or close the valve will be correspondingly received upon the balls.

Having thus described my invention, what I claim as new, and desire to secure by Letters Patent, is—

1. The combination with a gate movable transversely across the passage which it controls, and a screw-threaded non-turnable stem connected therewith, of a nut, through which the threaded portion of the stem passes, a hand-wheel by which said nut is turnable, an outwardly-projecting annular flange at the bottom of the nut, a chambered cap within which said flange is turnable and balls disposed between the opposite sides of the flange, and the adjacent sides of the chamber substantially as described.

2. In a transversely-movable gate of the character described, a screw-threaded non-turnable stem with which the gate is connected, an elongated nut through which the threaded portion of the stem passes and means by which the nut is rotated, an annular flange projecting around the periphery of the lower end of the nut having grooves or channels made upon the upper and lower surfaces thereof, a head and a removable and adjustable cap fitting thereon having a chamber through which the nut passes and into which the flange projects, annular removable disks grooved or channeled to coincide with the grooves or channels on the flange of the nut, said disks fitting the upper and lower part of the chamber and a series of balls fitting said grooves and forming a bearing for the flange.

In witness whereof I have hereunto set my hand.

JOHN HARRIS HENDY.

Witnesses:
HARRY J. LASK,
S. H. NOURSE.